(12) United States Patent
Purushothaman et al.

(10) Patent No.: US 11,327,667 B2
(45) Date of Patent: May 10, 2022

(54) DATA MIGRATION SYSTEM WITH RESOURCE USAGE MODELING FOR ADAPTIVE TARGET STORAGE DEVICE UTILIZATION

(71) Applicant: BANK OF AMERICA CORPORATION, Charlotte, NC (US)

(72) Inventors: Sasidhar Purushothaman, Hyderabad (IN); Narasimharao Bhupatiraju, Hyderabad (IN); Ram Prakash Bonam, Hyderabad (IN); Laxminarayana Koutarapu, Hyderabad (IN); Kiran Pulla, Hyderabad (IN); Ganugapati Smitha, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 35 days.

(21) Appl. No.: 16/902,633

(22) Filed: Jun. 16, 2020

(65) Prior Publication Data

US 2021/0389886 A1    Dec. 16, 2021

(51) Int. Cl.
*G06F 3/06* (2006.01)

(52) U.S. Cl.
CPC .......... *G06F 3/0631* (2013.01); *G06F 3/0604* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 9,003,416 B2 | 4/2015 | Gangemi et al. | |
| 10,031,785 B2 | 7/2018 | Gonzalez et al. | |
| 10,228,860 B2* | 3/2019 | Brue | G06F 3/064 |
| 11,256,595 B2* | 2/2022 | Khokhar | G06F 11/3447 |
| 2002/0091722 A1 | 7/2002 | Gupta et al. | |
| 2007/0112723 A1 | 5/2007 | Alvarez et al. | |
| 2012/0079497 A1 | 3/2012 | Gangemi et al. | |
| 2017/0269854 A1* | 9/2017 | Dimnaku | G06F 3/0613 |
| 2021/0034278 A1* | 2/2021 | Kaushik | G06F 3/0683 |

* cited by examiner

*Primary Examiner* — Arpan P. Savla
*Assistant Examiner* — Edmund H Kwong
(74) *Attorney, Agent, or Firm* — Moore & Van Allen PLLC; R.W. McCord Rayburn (57) ABSTRACT

A system for adaptive storage device utilization is provided. The system is configured to: determine a new workload request for a data structure comprising layers in a stack configured for storing data objects; analyze resource usage patterns of the layers of the data structure, the resource usage patterns comprising a rate and volume of resource consumption; simulate a change in a data storage resource demand for each of the layers of the data structure based on the new workload request by constructing a simulated model of the data structure under the new workload; calculate an adaptive data storage resource configuration based on the resource usage patterns of the layers and the constructed model; and deploy the adaptive data storage resource configuration for the data structure at a data storage location, wherein storage resources of the data storage location are allocated based on the adaptive data storage resource configuration.

20 Claims, 7 Drawing Sheets

DATA MIGRATION SYSTEM WITH RESOURCE USAGE MODELING FOR ADAPTIVE TARGET STORAGE DEVICE UTILIZATION

BACKGROUND

Current data migration and storage acquisition technologies do not provide means for accurately assessing an impact to service resulting from a change in input-output workload or storage technology. Without storage demand forecasting, the ensuing changes may lead to inadequate resource provisioning. As such, there exists a need for an improved data storage utilization and calibration system allowing for adaptive data migration.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system for adaptive storage device utilization is provided. The system comprises: a memory device with computer-readable program code stored thereon; a communication device connected to a network; a processing device, wherein the processing device is configured to execute the computer-readable program code to: determine a new workload request for a data structure, the data structure comprising layers in a stack configured for storing data objects; analyze resource usage patterns of the layers of the data structure, the resource usage patterns comprising a rate and volume of resource consumption; simulate a change in a data storage resource demand for each of the layers of the data structure based on the new workload request by constructing a simulated model of the data structure under the new workload; calculate an adaptive data storage resource configuration based on the resource usage patterns of the layers and the constructed model; and deploy the adaptive data storage resource configuration for the data structure at a data storage location, wherein storage resources of the data storage location are allocated based on the adaptive data storage resource configuration.

In one specific embodiment, the processing device is further configured to execute the computer-readable program code to calculate a breach limit for the data storage location based on the new workload request, wherein the data storage resource demand of the data structure exceeds the storage resources of the data storage location. In another embodiment, the processing device is further configured to execute the computer-readable program code to: determine that the data storage resource demand is approaching the breach limit for the data storage location; and deploy additional storage resources before a memory overflow occurs in response to determining that the data storage resource demand is approaching the breach limit.

In yet another embodiment, the processing device is further configured to execute the computer-readable program code to identify a point of failure in the data structure for the new workload request, wherein the point of failure comprises a breach limit or a performance bottleneck.

In yet another embodiment, the new workload request is associated with a migration of the data structure from a source storage environment to a target storage environment, and wherein the source storage environment and the target storage environment are different storage locations. In yet another embodiment, simulating a change in a data storage resource demand comprises modeling latency associated with the new workload request.

In yet another embodiment, the adaptive data storage resource configuration is further based on event operation data associated with the data structure, wherein the event operation data comprises state information, incident data, alert data, warning data, and environment behavior data associated with the data structure.

In yet another embodiment, the adaptive data storage resource configuration is further based on interlayer dependences of the data structure, and wherein the processing device is further configured to execute the computer-readable program code to identify the interlayer dependences of the data structure.

In yet another embodiment, the processing device is further configured to execute the computer-readable program code to deploy an initial static resource allocation to the layers of the data structure.

In yet another embodiment, the processing device is further configured to continually assess and recalculate the adaptive data storage resource configuration based on the change in the data storage resource demand.

In yet another embodiment, the change in the data storage resource demand based on the new workload request is associated with executed input/output operations for the data structure.

A computer-implemented method for adaptive storage device utilization is provided. The computer-implemented method comprises: determining a new workload request for a data structure, the data structure comprising layers in a stack configured for storing data objects; analyzing resource usage patterns of the layers of the data structure, the resource usage patterns comprising a rate and volume of resource consumption; simulating a change in a data storage resource demand for each of the layers of the data structure based on the new workload request by constructing a model of the data structure under the new workload; calculating an adaptive data storage resource configuration based on the resource usage patterns of the layers and the constructed model; and deploying the adaptive data storage resource configuration for the data structure at a data storage location, wherein storage resources of the data storage location are allocated based on the adaptive data storage resource configuration.

In one specific embodiment, the computer-implemented method further comprises calculating a breach limit for the data storage location based on the new workload request, wherein the data storage resource demand of the data structure exceeds the storage resources of the data storage location. In another embodiment, the computer-implemented method further comprises: determining that the data storage resource demand is approaching the breach limit for the data storage location; and deploying additional storage resources before a memory overflow occurs in response to determining that the data storage resource demand is approaching the breach limit.

In yet another embodiment, the computer-implemented method further comprises identifying a point of failure in the data structure for the new workload request, wherein the point of failure comprises a breach limit or a performance bottleneck.

In yet another embodiment, the new workload request is associated with a migration of the data structure from a source storage environment to a target storage environment, and wherein the source storage environment and the target storage environment are different storage locations. In yet another embodiment, wherein simulating a change in a data storage resource demand comprises modeling latency associated with the new workload request.

A computer program product for adaptive storage device utilization is also provided. The computer program product comprises a non-transitory computer-readable medium comprising computer-readable instructions, the computer-readable instructions, when executed by a processing device, cause the processing device to: determine a new workload request for a data structure, the data structure comprising layers in a stack configured for storing data objects; analyze resource usage patterns of the layers of the data structure, the resource usage patterns comprising a rate and volume of resource consumption; simulate a change in a data storage resource demand for each of the layers of the data structure based on the new workload request by constructing a model of the data structure under the new workload; calculate an adaptive data storage resource configuration based on the resource usage patterns of the layers and the constructed model; and deploy the adaptive data storage resource configuration for the data structure at a data storage location, wherein storage resources of the data storage location are allocated based on the adaptive data storage resource configuration.

In one specific embodiment, the computer-readable instructions, when executed by the processing device, further cause the processing device to calculate a breach limit for the data storage location based on the new workload request, wherein the data storage resource demand of the data structure exceeds the storage resources of the data storage location. In another embodiment, the computer-readable instructions, when executed by the processing device, further cause the processing device to: determine that the data storage resource demand is approaching the breach limit for the data storage location; and deploy additional storage resources before a memory overflow occurs in response to determining that the data storage resource demand is approaching the breach limit.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

The system of the invention is configured to simulate and assess an impact caused by a change in a resource demand (e.g., a change in an input/output workload) and/or a change in a utilized storage technology due to a data migration. The invention addresses the need for accurate forecasting of data storage and transfer needs from ensuring configuration changes and providing adequate resource provisioning to avoid system failures such as reaching a memory breach point or a stack overflow point. The system enables input/output modeling and simulation to constantly assess the input/output dynamics due to downstream changes while also quantifying a rate of change in storage resource consumption in order to proactively predict the change in needs of a data structure. The system is configured to constantly analyze input/output behavior and detect subtle changes in a constructed model while recording the consumption and usage patterns of a stored data structure and/or a storage location. The system is further configured to optimally allocate input/output streams dynamically based on the monitored and modeled data. In some embodiments, the invention equips storage administrators with the ability to simulate the possible load due to new applications in a development environment and proactively calculate an accurate or efficient sizing of a data storage location environment.

Embodiments of the invention are directed to improvements to data transfer and storage technology and, in particular, as applied to the migration or deployment of an application or other data structure within a data storage location. In some embodiments, the present system is configured to first determine a new workload request associated with a data structure (e.g., a layered data stack) and analyze resource usage patterns of the layers such as a rate of resource consumption and a volume of required resource for each layer. Using this data, the system is configured to simulate a change in the data structure resource demand for each of the layers of the data structure based on the new workload request by constructing a simulated model of the data structure under the new workload. The system then calculates an adaptive data storage resource configuration for the data structure at a data storage location, wherein storage resource at the data storage location are allocated for use by the various layers of the data structure based on individual consumption requirements and deployment priority (i.e., testing environment or production deployment environment).

Embodiments of the present invention use data storage hardware and resources as well as usage data in nonconventional, unexpected ways by proactively calculating storage configurations and leveraging simulated models in a development environment. The invention provides real-time user visibility of the impact on storage due to data structure or application changes. In some embodiments, the system is configured to proactively compute when a performance top of utilized data storage resources will be breached or when a stack overflow will occur. In some embodiments, the system is configured to add additional resource prior to a breach or overflow point to avoid failure and maintain application operation without performance degradation.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "computing resource" may refer to elements of one or more computing devices, networks, or the like available to be used in the execution of tasks or processes. A computing resource may be used to refer to available processing, memory, and/or network bandwidth, data usage or data transfer bandwidth or limits, and/or power of an individual computing device as well a plurality of computing devices that may operate as a collective for the execution of one or more tasks (e.g., one or more computing devices operating in unison). In some embodiments, user resources such as computing resources may include an amount of use-time during which the resources are being utilized by the system and/or other systems and devices described herein. In some embodiments, a "data storage resource" or "storage resource" may refer to computing resource to be used in the storage and/or transfer of data between data storage locations such as data storage hardware or network locations. In some embodiments data storage resources include available hardware system performance associated with a number of input/output operations able to be performed in an amount of time (e.g., input/output operations per second (IOPS)). Data storage resources may further include computer storage devices such as hard drives, solid state drives, storage area networks, and the like as well as associated latencies and data transfer efficiencies.

As used herein, the term "user" may refer to any entity or individual associated with the adaptive storage device utilization system. In some embodiments, a user may be a computing device user, a phone user, a mobile device application user, a customer of an entity or business (i.e., an interaction or transaction provider), a system operator, and/or employee of an entity (e.g., a financial institution). In one embodiment, the user is an individual or customer interacting with one or more devices within the system. In another embodiment, a user may be a system administrator, technician, software or application developer, computer engineer, support associate, or the like associated with the adaptive storage device utilization system, a data structure stored and/or analyzed by the system, and/or a data storage location utilized by the system. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, ATMs, global positioning system (GPS) devices, entertainment devices, or any combination of the aforementioned. The device may be used by the user to access the system directly or through one or more applications, an online portal, internet browser, virtual private network, or other connection channel. The user device comprises a display for providing a user interface to the user for interacting with an application displayed on the device and presented to the user. In some embodiments, a user device may comprise a clock/timer or counter, camera, location sensor (e.g., GPS), or the like.

As used herein, the term "entity" may be used to include any organization or collection of users that may interact with the adaptive storage device utilization system. An entity may refer to a business, company, or other organization that either maintains or operates the system or requests use and accesses the system. In one embodiment, an entity may include a data storage provider. In one embodiment, the entity may be a business or financial entity. The terms "financial institution" and "financial entity" may be used to include any organization that processes financial transactions including, but not limited to, banks, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution. In some embodiment, an entity may be a business, vendor, or the like that provides a resource (e.g., goods, services, or other resources) to another user or entity via an interaction at an interaction location (e.g., within an application, a web site, brick-and-mortar location).

As used herein, "authentication information" may refer to any information that can be used to authenticate an identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. In some embodiments, authentication information may refer to any information provided by a user, entity, or the like to verify an identify and/or status of the user, entity, data associated with a user or entity, or the like.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, data archive, or data structure, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise analyzing a change in a requested or calculated resource demand of a data structure and/or data storage locations. Monitoring of user data streams is performed by the system with approval or authorization by the monitored user device and user.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted through use interaction with a data stream (e.g., in real-time). In some embodiments, an interaction comprises a data transfer between devices or locations within the environment of the system described herein. For example, an interaction may require a transfer or migration of data between data storage locations.

In some embodiments, an interaction may further include user interactions with a user interface of a user application (e.g., clicking, swiping, text or data entry, etc.), authentication actions (e.g., signing-in, username and password entry, PIN entry, etc.), account actions or events (e.g., account access, fund transfers, document or record views and/or transfers, etc.) and the like. In another example, an interaction may refer to a user communication via one or more channels (i.e., phone, email, text, instant messaging, brick-and-mortar interaction, and the like) with an entity and/or entity system to complete an operation or perform an action. In yet another embodiment, an interaction may include any change in a data structure and/or data storage location.

Figure 1:
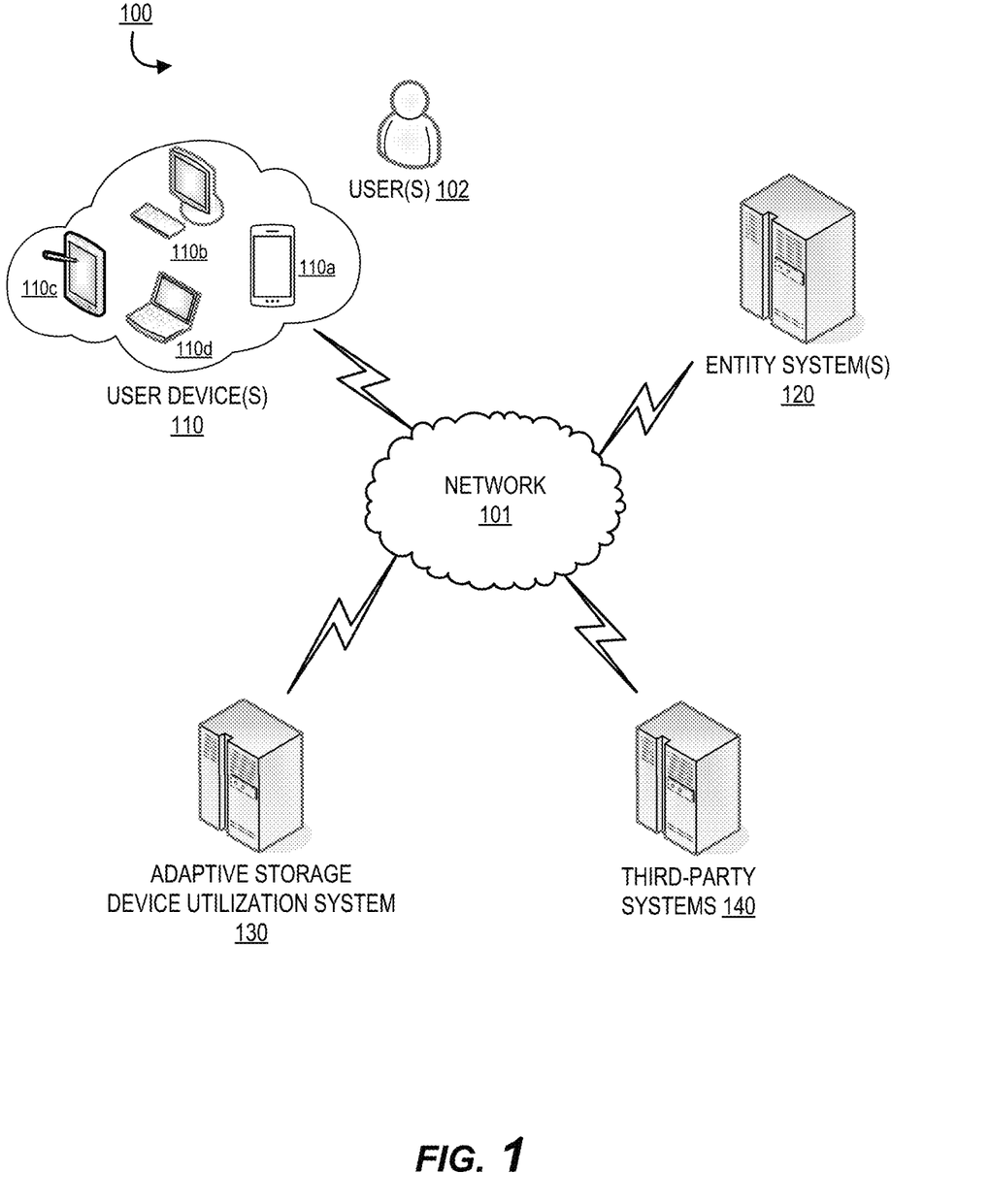
FIG. 1 provides an adaptive data storage utilization system environment, in accordance with one embodiment of the invention.

FIG. 1 provides an adaptive storage device utilization system environment 100, in accordance with one embodiment of the invention. As illustrated in FIG. 1, adaptive storage device utilization system 130 is operatively coupled, via a network 101, to the user device(s) 110 (e.g., a plurality of user devices 110a-110d), the entity system(s) 120, and third party systems 140. In this way, the adaptive storage device utilization system 130 can send information to and receive information from the user device 110, the entity system 120, and the third party systems 140. In the illustrated embodiment, the plurality of user devices 110a-110d provide a plurality of communication channels through which the entity system 120 and/or the adaptive storage device utilization system 130 may communicate with the user 102 over the network 101.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, as discussed herein, the network 101 may be a distributed network comprising an edge layer, a platform layer, and/or an enterprise layer.

In some embodiments, the user 102 is an individual interacting with one or more user devices either actively or passively, wherein the user devices are configured to interact and transmit commands to the adaptive storage device utilization system. In one embodiment, the data stream may be generated or modified, for example, by one or more entity systems 120 while the data stream between the user device 110 and the entity system 120 is monitored by the adaptive storage device utilization system 130 over the network 101. In an alternative embodiment, the user 102 is an individual interacting with the adaptive storage device utilization system 130 over the network 101 and monitoring a transfer of data between the user devices 110 and the entity systems 120 using the adaptive storage device utilization system 130 (e.g., an employee of the entity operating and/or monitoring the systems 120, 130).

Figure 2:
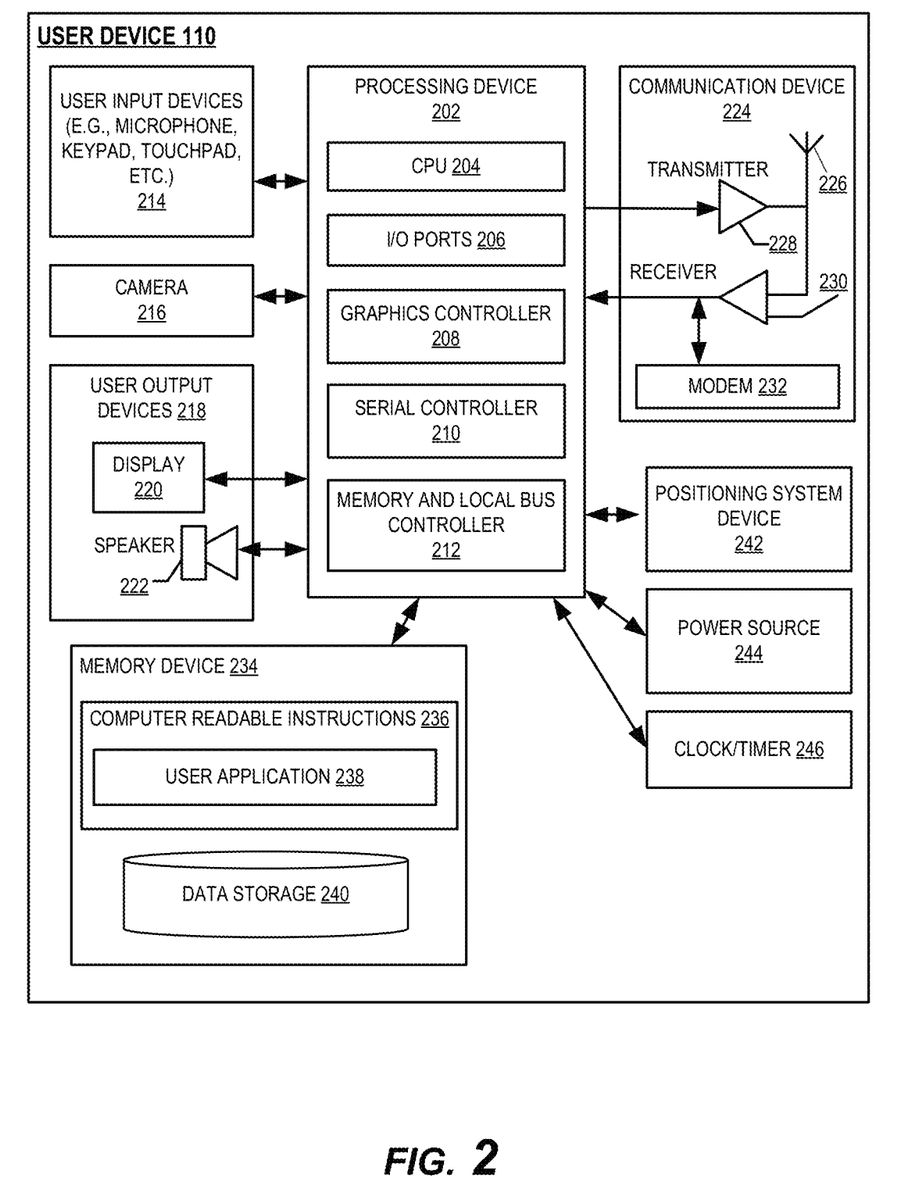
FIG. 2 provides a block diagram of a user device, in accordance with one embodiment of the invention.

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, and the like. In one embodiment, the camera 216 may include a scanner or any other image capturing device. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120 via a user interface. In some embodiments, the user application 238 is an application for interacting with other systems and devices over a network.

The processing device 202 may be configured to use the communication device 224 to communicate with one or more other devices on a network 101 such as, but not limited to the entity system 120 and the adaptive storage device utilization system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 101. In this regard, the user device 110 may be configured to operate with one or more air interface standards, communication protocols, modulation types, and access types. By way of illustration, the user device 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Figure 3:
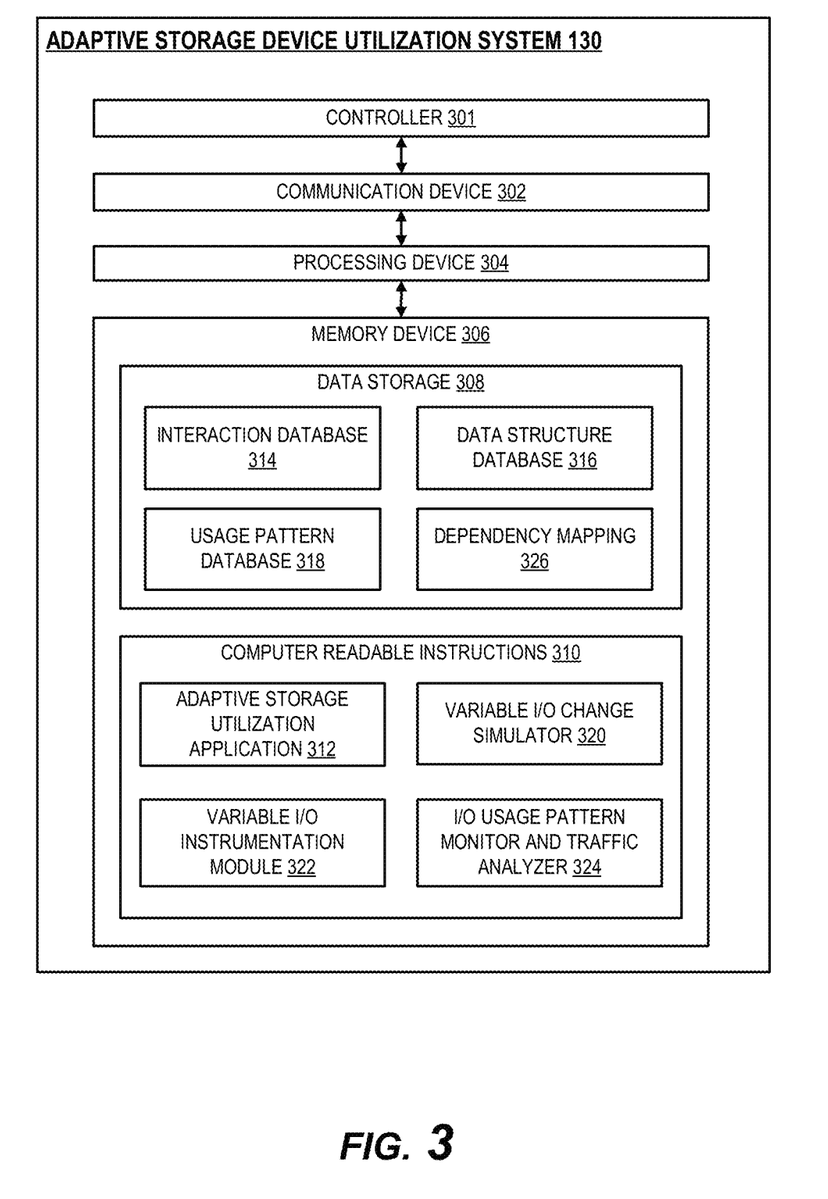
FIG. 3 provides a block diagram of an adaptive data storage utilization system, in accordance with one embodiment of the invention.

FIG. 3 provides a block diagram of an adaptive storage device utilization system 130, in accordance with one embodiment of the invention. The adaptive storage device utilization system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, third party systems 140, and/or the adaptive storage device utilization system 130, in order to interface and manage data flow between devices and systems while executing commands to control the systems. In some embodiments, the controller may be integrated into one or more of the systems described herein. In other embodiments, the controller may be a separate system or device. In some embodiments, the controller may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the adaptive storage device utilization system 130 comprises computer-readable instructions 310 stored in the memory device 306, which in one embodiment includes the computer-readable instructions 310 of an adaptive storage utilization application 312, a variable I/O change simulator 320, a variable I/O instrumentation module 322, and an I/O usage pattern monitor and traffic analyzer 324.

The adaptive storage utilization application 312 is configured to monitor and analyze data transferred between the user devices 110 and other systems of the environment. In some embodiments, the intelligent data transfer application 312 collects and combines or merges sensor data from user devices with contextual user and/or device data to be inserted into a rule generator that may leverage machine learning technology. In some embodiments, the application 312 is further configured to determine layer dependencies and events associated with the data structure. The variable I/O change simulator 320 is configured to calculate one or more data configuration flows from a plurality of user devices. The I/O usage pattern monitor and traffic analyzer 324 is configured to monitor and analyze the storage resource demands of data structures within one or more data storage locations such as resource usage patterns of the data structures including rates and volumes of resource consumption (e.g., input/output operations per second (IOPS)). The variable I/O instrumentation module 322 is configured to receive and process information from the various other components of the system such as the adaptive storage utilization application 312, the variable I/O change simulator 320, the I/O usage pattern monitor and traffic analyzer 324, and the total storage of the data storage locations. The variable I/O instrumentation module 322 is configured to calculate and output an adaptive data storage resource configuration for the data structure within a target data storage location based on the processed data, wherein the configuration is applied to the data structure within the storage location. In some embodiments, the variable I/O instrumentation module 322 leverages artificial intelligence and machine learning engines to process the information received from the system.

In some embodiments, the memory device 306 includes data storage 308 for storing data related to the system environment, but not limited to data created and/or used by the adaptive storage utilization application 312, variable I/O change simulator 320, variable I/O instrumentation module 322, and I/O usage pattern monitor and traffic analyzer 324. Data stored in the data storage 308 may comprise an interaction database 314, data structure database 316, a usage pattern database 318, and a dependency mapping database 326.

The interaction database 314 is used to store information regarding past interactions (e.g., data transfers, data structure reconfigurations, data resource reconfigurations, device actions or interactions, user communications, etc.) associated with the stored data structures and/or data storage locations. In some embodiments, the interaction database 314 may be configured to store data from an incoming data stream in real-time. The interaction database 314 may further include information or data related to the interactions such as user data, user selections, and the like. The system may be configured to access and update stored information and data stored in the interaction database 314 as additional information is collected.

The data structure database 316 is configured to store one or more data structures monitored and processed by the system. In some embodiments, the data structure database 316 comprises one or more data storage locations such as servers, data centers, or the like. The usage pattern database 318 is configured to store data associated with the behavior and traffic of the data structures in the system such as past or current resource consumption rates and volumes. In some embodiments, the usage pattern database 318 may be configured to store one or more events associated with the data structures. The dependency mapping database or storage 326 is configured to store identified intralayer dependencies or relationships between the various layers of one or more data structures.

In one embodiment of the invention, the adaptive storage device utilization system 130 may associate with applications having computer-executable program code that instruct the processing device 304 to perform certain functions described herein. In one embodiment, the computer-executable program code of an application associated with the user device 110, third party systems 140, and/or the entity systems 120 may also instruct the processing device 304 to perform certain logic, data processing, and data storing functions of the application.

Embodiments of the adaptive storage device utilization system 130 may include multiple systems, servers, computers or the like maintained by one or many entities. In some embodiments, the adaptive storage device utilization system 130 may be part of the entity systems 120. In other embodiments, the entity systems 120 are distinct from the adaptive storage device utilization system 130. The adaptive storage device utilization system 130 may communicate with the entity systems 120 via a secure connection generated for secure encrypted communications between the two systems either over the network 101 or alternative to the network 101.

Figure 4:
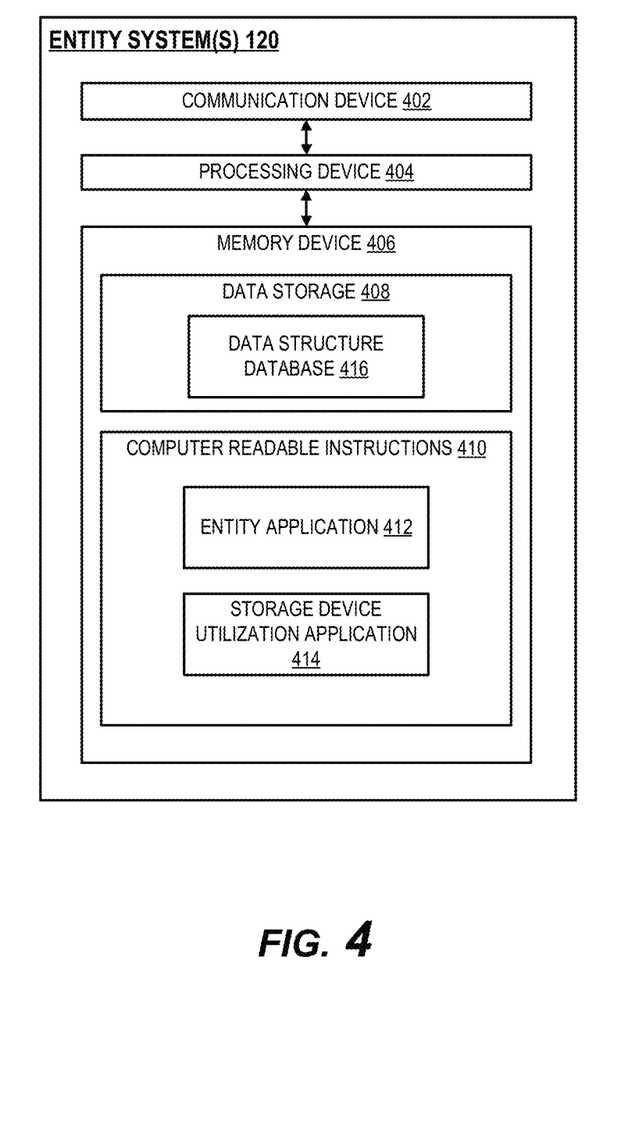
FIG. 4 provides a block diagram of an entity system, in accordance with one embodiment of the invention.

As illustrated in detail in FIG. 4, the environment 100 further includes one or more entity systems 120 which are connected to the user device 110, the adaptive storage device utilization system 130, and the third party systems 140. The entity systems 120 may be associated with one or more entities, institutions, or the like. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412 and an storage device utilization application 414. The storage device utilization application 414 may be configured to assist in deploying a calculated data storage resource configuration at a data storage location maintained by the entity. The entity systems 120 may communicate with the user device 110, third party systems 140, and the adaptive storage device utilization system 130 to provide access to information and accounts stored and maintained on the entity systems 120. In some embodiments, the entity system 120 may communicate with the adaptive storage device utilization system 130 during an interaction with a user 102 in real-time, wherein user interactions may be monitored and processed by the adaptive storage device utilization system 130. In some embodiments, data storage 408 comprises a data structure database 416 to either supplement or replace data structure storage of the adaptive storage device utilization system 130 as previously discussed.

The systems of the environment 100 are configured to simulate and assess an impact caused by a change in a storage resource demand (e.g., a change in an input/output workload) and/or a change in a utilized storage technology due to a data migration. The invention addresses the need for accurate forecasting of data storage and transfer needs from ensuring configuration changes and providing adequate resource provisioning to avoid system failures such as reaching a memory breach point or a stack overflow point. The system enables input/output modeling and simulation to constantly assess the input/output dynamics due to downstream changes while also quantifying a rate of change in storage resource consumption in order to proactively predict the change in needs of a data structure. The system is configured to constantly analyze input/output behavior and detect subtle changes in a constructed model while recording the consumption and usage patterns of a stored data structure and/or a storage location. The system is further configured to optimally allocate input/output streams dynamically based on the monitored and modeled data. In some embodiments, the invention equips storage administrators with the ability to simulate the possible load due to new applications in a development environment and proactively calculate an accurate or efficient sizing of a data storage location environment.

Figure 5A:
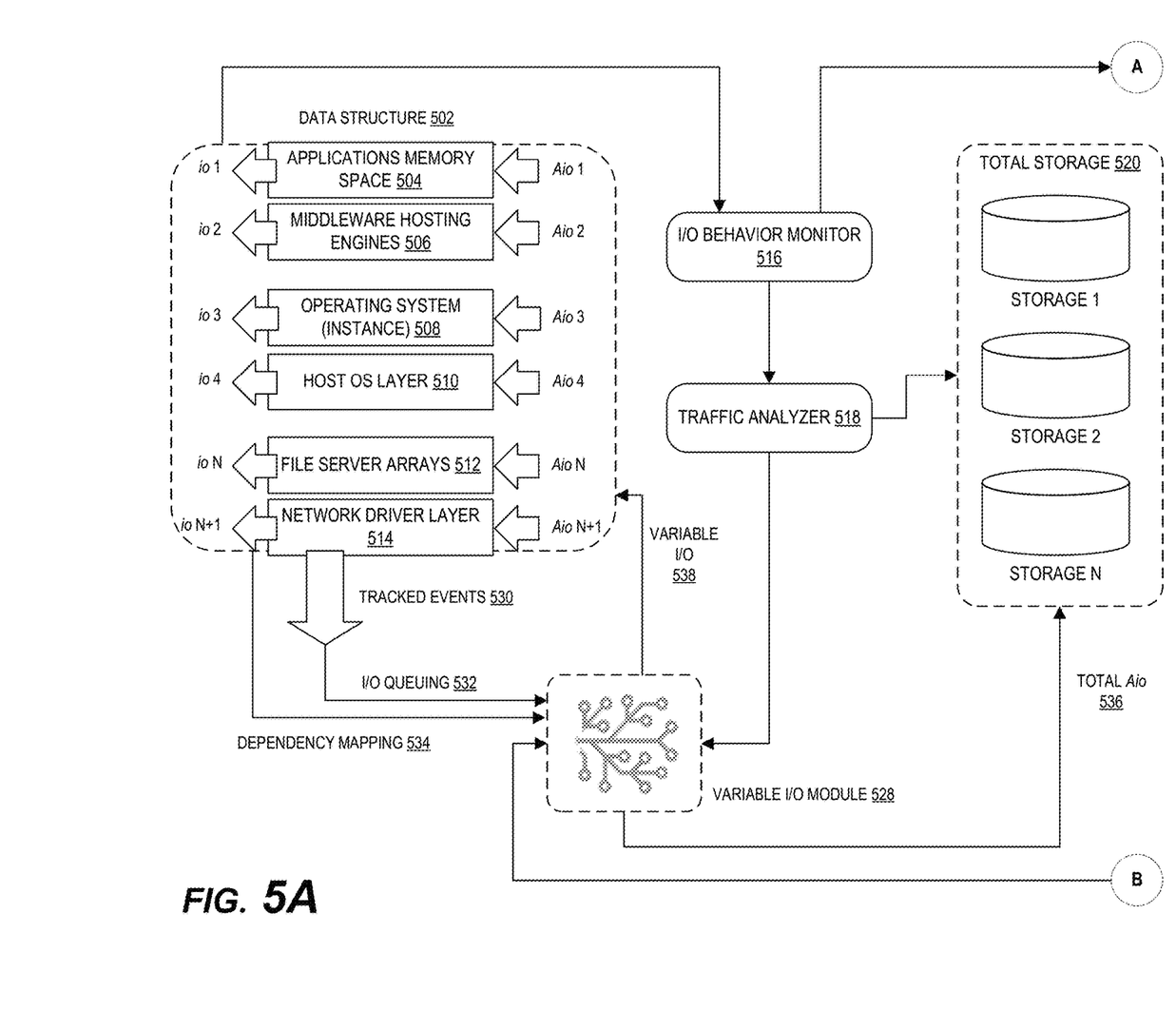
FIG. 5A provides an illustration of data flow within an adaptive data storage resource utilization system, in accordance with one embodiment of the invention.
Figure 5B:
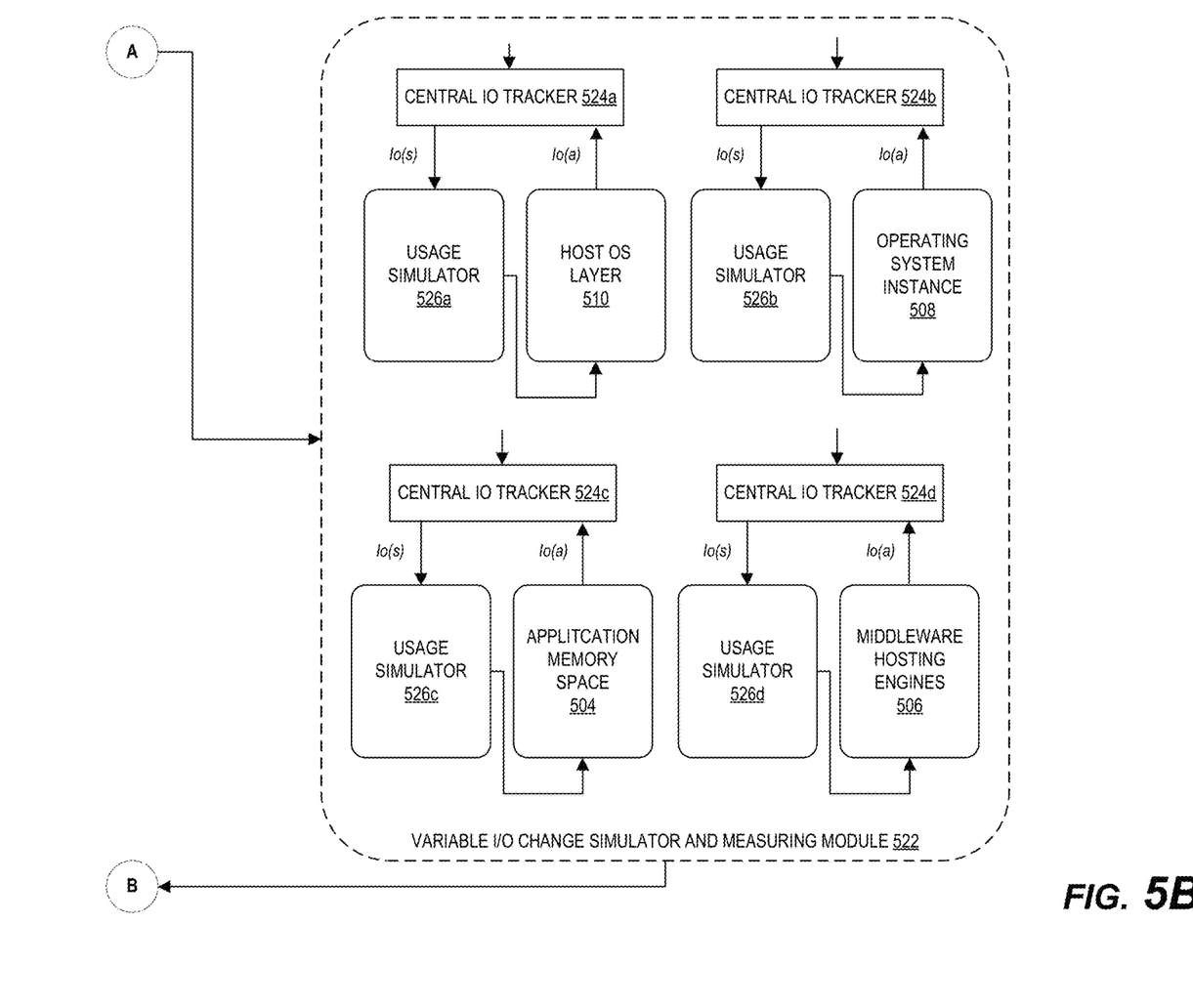
FIG. 5B provides an illustration of data flow within an adaptive data storage resource utilization system, in accordance with one embodiment of the invention.

FIGS. 5A and 5B provides an illustration of data flow within an adaptive data storage resource utilization system environment, in accordance with one embodiment of the invention. As illustrated in the figures, the system environment comprises at least one data structure such as data structure 502. As used herein, a "data structure" may refer to any storage or ordered collection of data objects. In some embodiments, a data structure may refer to a stacked structure comprising one or more data layers, wherein data objects are added to the stack on top of previously entered items to form an ordered collection of layered data objects which can then be removed. Non-limiting examples of layered data structures or stacks include data caches and data queues for ordered processing. In some embodiments, a stack may provide storage for an associated application by providing storage for the application. In some embodiments, a data structure may refer to a protocol stack comprising layers of multiple network protocols working in unison.

In the illustrated embodiment of FIG. 5A, the system environment comprises a data structure 502 comprising layered data objects forming a stack. The layered data structure 502 comprises an application memory space 504, middle ware hosting engines 506, operating system 508, host operating system layer 510, file server arrays 512, and a network driver layer 514. Generally, a data structure, such as data structure 502, may comprise data layers 1-n. It should be understood that data structure 502 of FIG. 5A is merely an example of a data structure for purposes of explanation and that other data structures with alternative compositions or different layers may be processed by the system. For example, the system may be configured to initially assign units of I/O resources (e.g., 50 units of a total 200 available unites) to each individual or groups of layers based on data associated with each layer and/or stored historical consumption patterns or demands.

Each of the data layers of data structure comprises a static input/output consumption (e.g., io1–io(N+1)) assigned by the system based on a total number of data storage resources available at a current and/or target data storage location. The assigned static I/O resources act as a baseline for analysis and calculation of adaptive resource demand of the structure by the system. Each of the layers of the data structure further comprise an adaptive I/O consumption configuration of values (e.g., Aio1–Aio(N+1)) calculated by the system and deployed back to the data structure based on actual performance requirements of the data structure within an assigned data storage location as discussed herein.

The I/O performance of the data structure 502 is monitored and analyzed by I/O behavior monitor 516 and traffic analyzer 518 to determine usage patterns of the components of the data structure 502 such as a rate of data resource consumption (i.e., IOPS) and a volume of data resource consumption (e.g., total required bandwidth, total required memory storage). In some embodiments, the I/O behavior monitor 516 is configured to determine resource demand of a stack and/or individual layers in real-time. In some embodiments, the traffic analyzer 518 is configured to monitor data sequencing between the layers of a stacked structure and determine a flow of data between the layers which can have an impact on resource demand. The system further reaches out to a total storage 520 which comprises a total amount of data storage resources available to determine how much data storage resources are available. As illustrated in FIG. 5A, the total storage 520 comprises storage units 1-N. The data flow continues from the I/O behavior monitor 516 and the traffic analyzer 518 to the variable I/O module 528.

The system is further configured to output an analyzed data stream from the I/O behavior monitor 516 to a variable I/O change simulator and measure module 522 as illustrated in FIG. 5B. The simulator module 522 is configured to receive the baseline I/O assignments for the stacked data structure and construct a model that analyzes actual data storage resource consumption of each layer. The simulator module 522 comprises a plurality of central I/O trackers (e.g., 524a-d) and usage simulators (e.g., 526a-d) configured for receiving the data from the behavior monitor 516 and simulating a data storage resource demand for the individual components of the data structure 502. The usage simulator 526 is provided with a simulated I/O consumption (io(s)) based on an actual I/O consumption (io(a)) which may be the static baseline values initially assigned to the data structure 502. The usage simulator 526 models the simulated I/O consumption and outputs the modeled configuration information back to the corresponding layer within the testing environment of the simulator module 522. This process continuously refines a simulated data storage resource consumption to converge on an acceptable solution within predetermined limits set by a maintaining entity.

The simulated results from the variable I/O change simulator and measuring module 522 are output to variable I/O module 528 which also receives the current consumption of the actual stack from the traffic analyzer 518 as illustrated in FIGS. 5A and 5B. In addition, the variable I/O module 528 further is configured to receive operation data and event data (e.g., tracked events 530 and I/O queuing 532) from each of the components of the data structure indicating how the actual environment of the data structure is behaving. Event data may comprise, for example, incident reports, alerts, warnings, or the state of the data structure environment at any given point or context. The system is further configured to provide dependency mapping data 534 associated with the data structure 502 to the variable I/O module 528. In one embodiment, dependencies between data structures and/or layers of a stacked data structures are determined and mapped by a user or operator of the system. In another embodiment, the system is configured to automatically map dependencies of the data structure.

Using these inputs, the variable I/O module 528 is configured to compute the resource demand requirements of the data structure (e.g., stack and/or individual layer requirements) based on the functionality, usage, dependency, and contextual behaviors of the analyzed data structure. The variable I/O module 528 is configured to calculate a configuration of the available data storage resources and deploy the configuration for the data structure based on the input factors. The variable I/O module 528 is configured to allocate the available resource for the combined data structure with a tolerance for each of the components and further define throttling for the components. In this way, the system provides an adaptable engine for allocating data storage resources based on the continual collection of event data and behavioral data of the data structure over time. The variable I/O configuration 538 is deployed for the data structure 502, wherein the calculated adaptive I/O assigned values (i.e., Aio1–Aio(N+1)) provided to the data structure.

Figure 6:
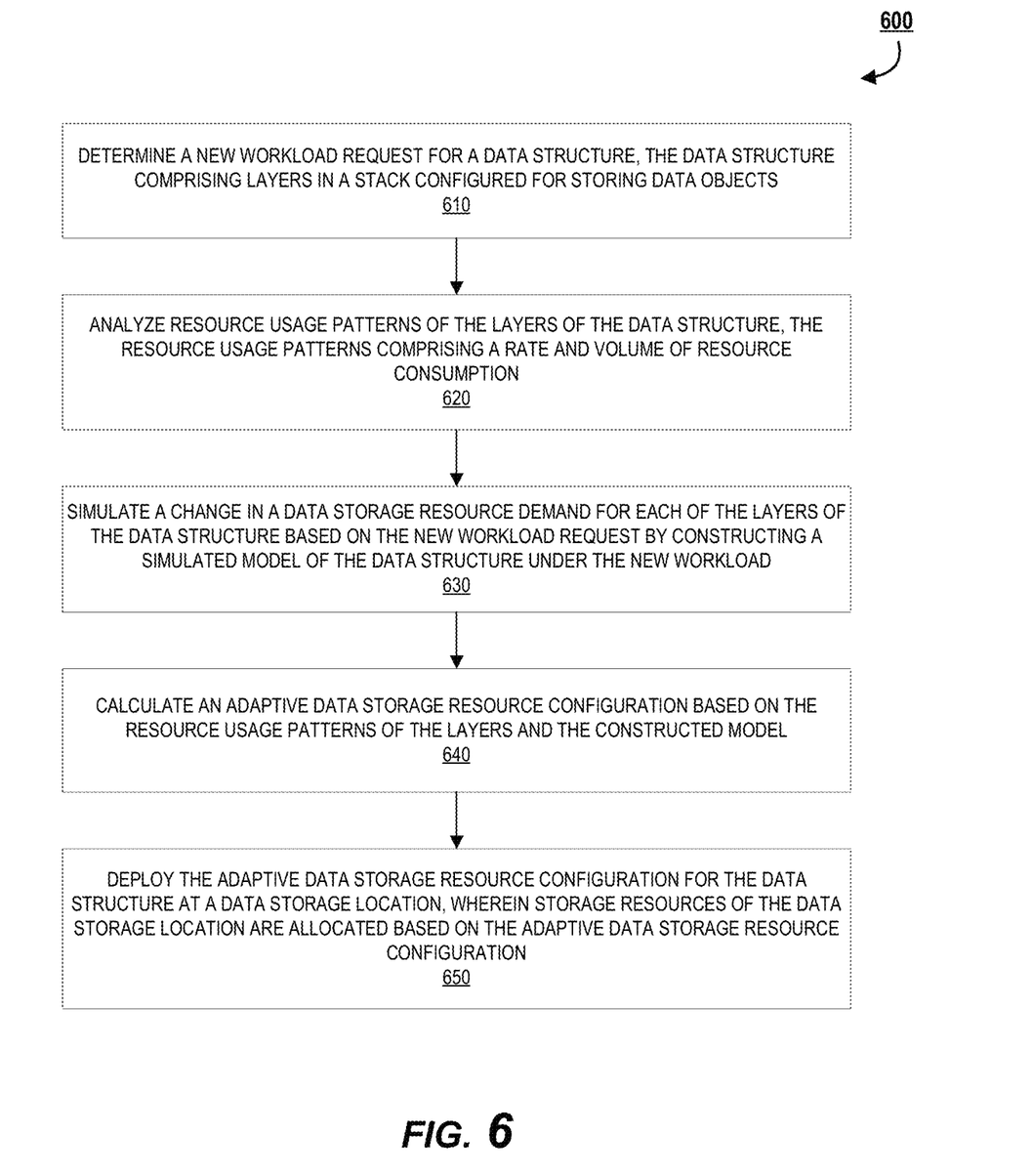
FIG. 6 provides a high level process flow for adaptive data storage resource modeling and deployment, in accordance with one embodiment of the invention.

FIG. 6 provides a high level process flow for adaptive data storage resource modeling and deployment, in accordance with one embodiment of the invention. In some embodiments, the process flow of FIG. 6 is executed or performed by the system environments of the previous figures. As illustrated at block 610 of FIG. 6, the system is configured to first determine a new workload request for a data structure. As previously discussed, the data structure may comprise one or more layers in a stack configured for storing data objects. In some embodiments, the new workload request may comprise a change in the data storage resource demand. In one embodiment, a change in the data storage resource demand of a new workload request may be associated executed input/output operations for the data structure (e.g., IOPS). For example, the new workload request may require a shift in the allocated data storage resources, wherein additional or fewer data storage resources are required for one or more components of the data structure based on calculated demand.

In some embodiments, a change in a data storage resource demand may be associated with a change in resource storage locations. In one non-limiting example, a new workload request may be associated with a migration of a data structure from a source storage environment to a target storage environment (i.e., between storage locations), wherein the source storage environment and the target storage environment are different storage locations having different available data storage resources (e.g., total available memory, operation speed, data channel bandwidth).

At block 620, the system is configured to analyze resource usage patterns of the layers of the data structure. The system may be configured to constantly monitor usage patterns and behavior of the data structure and detect any changes such as changes in resource demand, changes to the organization of the data structure (e.g., removal or addition of a layer), access frequency or data calls for one or more layers of the data structure, and the like. In one embodiment, the analyzed resource usage patterns for the data structure include a rate of resource consumption and a volume of resource consumption for the data structure as a whole and/or individual components of the data structure. As discussed with respect to FIG. 5A, the system comprises a behavior monitor module configured for analyzing a volume of data storage resource consumption by the data structure and a traffic analyzer module configured for analyzing a rate of data storage resource consumption by the data structure.

The system is further configured to analyze the data structure to identify interlayer dependences of the data structure. For example, in a particular data structure, data may first be required to pass through a first data layer before passing through a second data layer, wherein the second layer has a dependency on the first layer. In this example, the first layer may act as bottleneck for the second layer and limit a data throughput for the data structure as a whole. In some embodiments, the system is further configured to identify event operation data associated with the data structure. In some embodiments, the event operation data may comprise state information, incident data, alert data, warning data, and environment behavior data associated with the data structure. In one embodiment, the event operation data is fed to the system by a maintaining entity and/or system operator.

At block 630, the system is configured to simulate a change in a data storage resource demand for each of the layers of the data structure based on the new workload request. The system is configured to construct a simulated model of the data structure under the new workload conditions and resource demands. The system constructs the simulated model based on the actual current performance of the data structure using an initial static resource allocation and the analyzed usage patterns, behavior, and traffic of the data structure. The system calculates a new, simulated resource demand for the data structure and models the result within a testing environment. The system is configured to continuously recalculate the simulated resource allocation for the data structure within the testing environment to determine a potential solution. In some embodiments, the system is configured to simulate performance for individual components of a data structure within a testing environment. In one exemplary embodiment, the system is configured to simulate or model the impact of latency associated with a new workload request.

At block 640, the system is configured to calculate an adaptive storage resource configuration based on the resource usage patterns of the layers and the constructed model. The system is configured to receive the simulated results from the constructed model as well as the current consumption of the actual data structure from the behavior monitor and traffic analyzer modules. The system combines this data with the collected operation and event data and the dependency mapping for the data structure. Using these inputs, the system is configured to compute the resource demand requirements of the data structure (e.g., stack and/or individual layer requirements) based on the functionality, usage, dependency, and contextual behaviors of the analyzed data structure. The system is configured to calculate a configuration of the available data storage resources and deploy the configuration for the data structure based on the input factors. The system is configured to allocate the available resource for the combined data structure with a tolerance for each of the components and further define throttling for the components. In this way, the system provides an adaptable engine for allocating data storage resources based on the continual collection of event data and behavioral data of the data structure over time.

At block 650, the system is configured to deploy the calculated adaptive data storage resource configuration for the data structure location, wherein storage resources of the data storage location are allocated based on the adaptive data storage resource configuration. In some embodiments, the system is configured to continually assess and recalculate the adaptive data storage resource configuration based on the change in the data storage resource demand. In this way, the system may continually evaluate and recalculate the demands of the data structure as the resource demands change over time.

In one embodiment, the system is further configured to identify a point of failure in the data structure for the new workload request based on the analyzed resource consumption and simulated model of the data structure. A point of failure for the data structure may comprise a breach limit, overflow point, or a performance bottleneck for the data structure and/or an individual component of the data structure, wherein the current resource allocation will be inadequate for the data storage resource demands of a storage location. In response, the system may be configured to calculate a simulated breach limit for the data storage location based on the new workload request, wherein the data storage resource demand of the data structure exceeds the storage resources of the data storage location.

In some embodiments, the system may be configured to determine that the data storage resource demand is approaching a calculated breach limit for the data storage location. The system may be further configured to deploy additional storage resources before a memory overflow occurs in response to determining that the data storage resource demand is approaching the breach limit. For example, the system may allocate additional memory or alternative memory (e.g., higher capacity and/or performance memory hardware) for the data structure to alleviate the impending point of failure. In another example, the system may migrate at least a portion of the data structure to an alternative of supplemental data storage location.

In a specific embodiment of the invention, the system enables intelligent data storage resource provisioning for a data structure based on the analyzed data, simulated storage models and performance, and fault tolerance analysis. A user of the system may inform a data storage provider accurate resource requirements for storage of a data structure on the systems and hardware of the provider. Based on the usage patterns and simulated performance of a stored data structure, the user may inform the provider of specific data storage resource requirements for a stored data structure over time. For example, the system may show that the data structure requires a first amount of memory during a first period of time and second amount of memory during a second period of time. Furthermore, the adaptive data storage utilization of the present invention may shift data storage resource allocation during these periods to accommodate the change in resource demands. Additionally, the adaptive data storage utilization may enable a user to optimize data storage resource provisioning with respect to storage cost by providing accurate resource demands of a data structure. For example, the system may enable a user to be informed as to the resource demands of the data structure and choose a mixture of high cost, high performance memory and lower cost, lower performance memory based on the specific needs of the data structure. In a specific example, lower cost and performance memory may be used for the data structure during a non-production period or for a non-production data structure or application.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with deploying adaptive storage utilization configurations based on simulated resource modeling and usage patterns.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for deploying adaptive storage utilization configurations based on simulated resource modeling and usage patterns, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for adaptive storage device utilization, the system comprising:
a memory device with computer-readable program code stored thereon;
a communication device connected to a network;
a processing device, wherein the processing device is configured to execute the computer-readable program code to:
monitor a real-time data stream of data transferred between user devices and a data structure, wherein the data structure comprises a stacked structure of data objects forming layers in the stacked structure, and wherein the real-time data stream comprises input/output streams of operations for the data structure;
determine, in real-time and based on the input/output streams, resource demand on the data structure by determining resource demands on the stacked structure and on each of the layers;
monitor data sequencing between the layers of the stacked structure to determine a flow of data between the layers;
identify, based on the flow of the data between the layers, dependences between the layers;
determine, based on monitoring the real-time data stream, a change in the resource demand on the data structure, wherein the change in the resource demand comprises new input/output streams of operations for the data structure;
construct, based on the change in the resource demand, a model of the data structure, wherein the model comprises layers;
simulate, on the model of the data structure and using the new input/output streams, the change in the resource demand;
determine, based on the simulated change in the resource demand, resource usage patterns of the layers of the model;
calculate an adaptive data storage resource configuration based on the resource usage patterns of the layers of the model and based on the dependences between the layers of the stacked structure, wherein the adaptive storage resource configuration allocates the new input/output streams to the data structure based on the resource usage patterns of the layers of the model and based on the dependences between the layers of the stacked structure; and
deploy the adaptive data storage resource configuration for the data structure at a data storage location, wherein storage resources of the data storage location are allocated based on the adaptive data storage resource configuration.

2. The system of claim 1, wherein the processing device is further configured to execute the computer-readable program code to calculate, based on the change in the resource demand, a breach limit for the data storage location, wherein the breach limit corresponds to a data storage resource demand that exceeds the storage resources of the data storage location.

3. The system of claim 2, wherein the processing device is further configured to execute the computer-readable program code to:

determine that the data storage resource demand is approaching the breach limit for the data storage location; and
deploy additional storage resources before a memory overflow occurs in response to determining that the data storage resource demand is approaching the breach limit.

4. The system of claim 1, wherein the processing device is further configured to execute the computer-readable program code to identify a point of failure in the data structure for the change in the resource demand, wherein the point of failure comprises a breach limit or a performance bottleneck.

5. The system of claim 1, wherein the change in the resource demand is associated with a migration of the data structure from a source storage environment to a target storage environment, and wherein the source storage environment and the target storage environment are different storage locations.

6. The system of claim 5, wherein the processing device is configured to execute the computer-readable code to, when simulating the change in the resource demand, model latency of the model of the data structure.

7. The system of claim 1, wherein the processing device is configured to execute the computer-readable code to, when calculating the adaptive data storage resource configuration, calculate the adaptive data storage resource configuration based on event operation data associated with the data structure, wherein the event operation data comprises state information, incident data, alert data, warning data, and environment behavior data associated with the data structure.

8. The system of claim 1, wherein the processing device is further configured to execute the computer-readable program code to deploy an initial static resource allocation to the layers of the data structure.

9. The system of claim 1, wherein the processing device is further configured to execute the computer-readable code to continually assess and recalculate the adaptive data storage resource configuration based on changes in resource demand.

10. A computer-implemented method for adaptive storage device utilization, the computer-implemented method comprising:
monitoring a real-time data stream of data transferred between user devices and a data structure, wherein the data structure comprises a stacked structure of data objects forming layers in the stacked structure, and wherein the real-time data stream comprises input/output streams of operations for the data structure;
determining, in real-time and based on the input/output streams, resource demand on the data structure by determining resource demands on the stacked structure and on each of the layers;
monitoring data sequencing between the layers of the stacked structure to determine a flow of data between the layers;
identifying, based on the flow of the data between the layers, dependences between the layers;
determining, based on monitoring the real-time data stream, a change in the resource demand on the data structure, wherein the change in the resource demand comprises new input/output streams of operations for the data structure;
constructing, based on the change in the resource demand, a model of the data structure, wherein the model comprises layers;

simulating, on the model of the data structure and using the new input/output streams, the change in the resource demand;

determining, based on the simulated change in the resource demand, resource usage patterns of the layers of the model;

calculating an adaptive data storage resource configuration based on the resource usage patterns of the layers of the model and based on the dependences between the layers of the stacked structure, wherein the adaptive storage resource configuration allocates the new input/output streams to the data structure based on the resource usage patterns of the layers of the model and based on the dependences between the layers of the stacked structure; and deploying the adaptive data storage resource configuration for the data structure at a data storage location, wherein storage resources of the data storage location are allocated based on the adaptive data storage resource configuration.

11. The computer-implemented method of claim 10 further comprising calculating, based on the change in the resource demand, a breach limit for the data storage location, wherein the breach limit corresponds to a data storage resource demand that exceeds the storage resources of the data storage location.

12. The computer-implemented method of claim 11 further comprising:
determining that the data storage resource demand is approaching the breach limit for the data storage location; and
deploying additional storage resources before a memory overflow occurs in response to determining that the data storage resource demand is approaching the breach limit.

13. The computer-implemented method of claim 10 further comprising identifying a point of failure in the data structure for the change in the resource demand, wherein the point of failure comprises a breach limit or a performance bottleneck.

14. The computer-implemented method of claim 10, wherein the change in the resource demand is associated with a migration of the data structure from a source storage environment to a target storage environment, and wherein the source storage environment and the target storage environment are different storage locations.

15. The computer-implemented method of claim 14, wherein simulating the change in the resource demand comprises modeling latency of the model of the data structure.

16. A computer program product for adaptive storage device utilization, wherein the computer program product comprises a non-transitory computer-readable medium comprising computer-readable instructions, the computer-readable instructions, when executed by a processing device, cause the processing device to:
monitor a real-time data stream of data transferred between user devices and a data structure, wherein the data structure comprises a stacked structure of data objects forming layers in the stacked structure, and wherein the real-time data stream comprises input/output streams of operations for the data structure;
determine, in real-time and based on the input/output streams, resource demand on the data structure by determining resource demands on the stacked structure and on each of the layers;
monitor data sequencing between the layers of the stacked structure to determine a flow of data between the layers;
identify, based on the flow of the data between the layers, dependences between the layers;
determine, based on monitoring the real-time data stream, a change in the resource demand on the data structure, wherein the change in the resource demand comprises new input/output streams of operations for the data structure;
construct, based on the change in the resource demand, a model of the data structure, wherein the model comprises layers;
simulate, on the model of the data structure and using the new input/output streams, the change in the resource demand;
determine, based on the simulated change in the resource demand, resource usage patterns of the layers of the model;
calculate an adaptive data storage resource configuration based on the resource usage patterns of the layers of the model and based on the dependences between the layers of the stacked structure, wherein the adaptive storage resource configuration allocates the new input/output streams to the data structure based on the resource usage patterns of the layers of the model and based on the dependences between the layers of the stacked structure; and
deploy the adaptive data storage resource configuration for the data structure at a data storage location, wherein storage resources of the data storage location are allocated based on the adaptive data storage resource configuration.

17. The computer program product of claim 16, wherein the computer-readable instructions, when executed by the processing device, further cause the processing device to calculate, based on the change in the resource demand, a breach limit for the data storage location, wherein the breach limit corresponds to a data storage resource demand that exceeds the storage resources of the data storage location.

18. The computer program product of claim 17, wherein the computer-readable instructions, when executed by the processing device, further cause the processing device to:
determine that the data storage resource demand is approaching the breach limit for the data storage location; and
deploy additional storage resources before a memory overflow occurs in response to determining that the data storage resource demand is approaching the breach limit.

19. The computer program product of claim 17, wherein the computer-readable instructions, when executed by the processing device, further cause the processing device to identify a point of failure in the data structure for the change in the resource demand, wherein the point of failure comprises a breach limit or a performance bottleneck.

20. The computer program product of claim 17, wherein the change in the resource demand is associated with a migration of the data structure from a source storage environment to a target storage environment, and wherein the source storage environment and the target storage environment are different storage locations.

* * * * *